Feb. 13, 1951          K. E. LYMAN          2,541,707
DIAPHRAGM OPERATED DISK BRAKE
Filed July 5, 1947          2 Sheets-Sheet 2
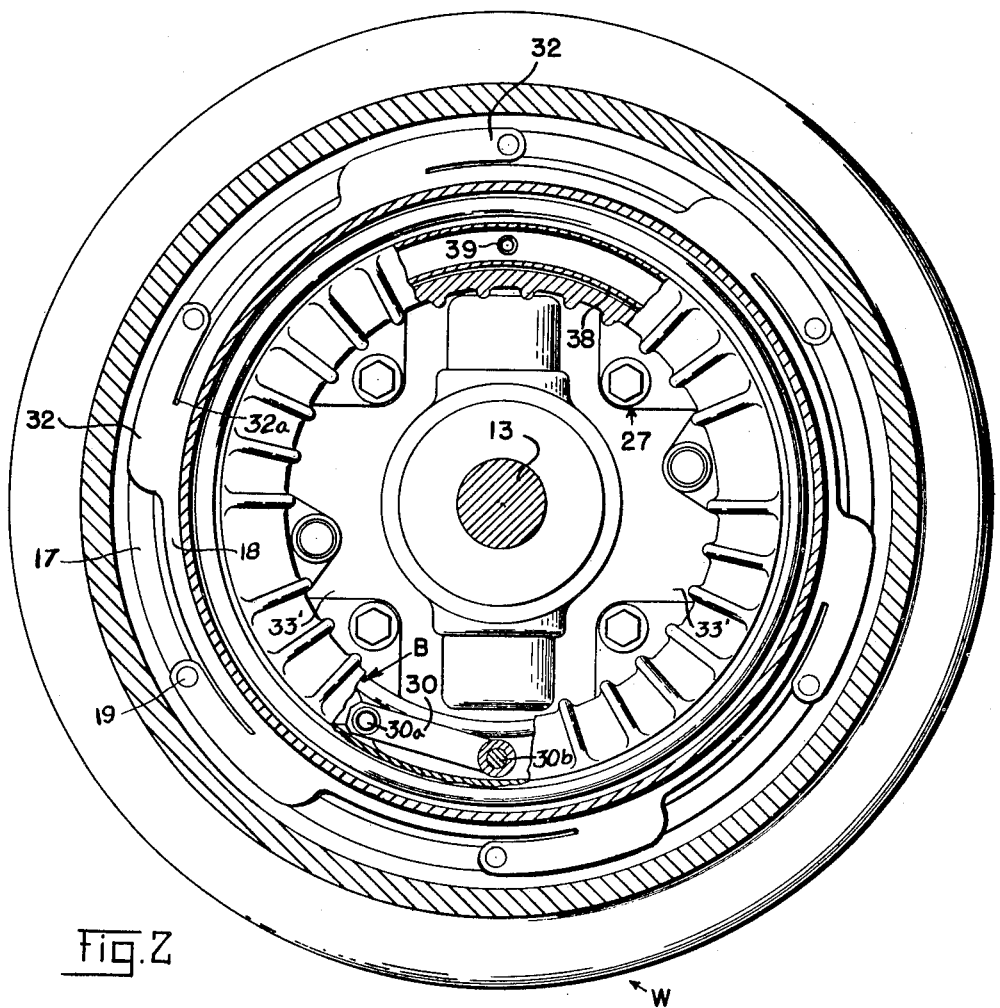
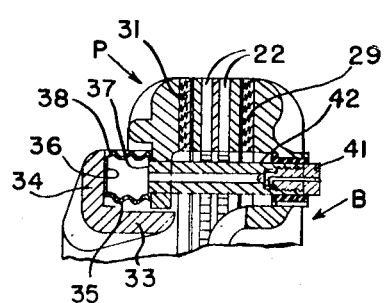
INVENTOR
KENNETH E. LYMAN Patented Feb. 13, 1951

2,541,707

UNITED STATES PATENT OFFICE 2,541,707

DIAPHRAGM OPERATED DISK BRAKE

Kenneth E. Lyman, Lake Forest, Ill., assignor to Tucker Corporation, Chicago, Ill., a corporation of Delaware Application July 5, 1947, Serial No. 759,264

2 Claims. (Cl. 188—152)

The present invention deals with disc brakes and is concerned primarily with novel mechanism for clamping the discs into braking engagement.

There is a very noticeable trend in the field of automotive engineering to the use of disc brakes. A disc brake of the type with which this invention is concerned consists essentially of a backing plate that is mounted on the vehicle and held against both rotative and axial movement. A pressure plate is mounted in spaced relation on and from the backing plate, and is held against rotative movement but is movable axially with respect to the pressure plate. A friction disc is interposed between these plates and is drivably connected to the vehicle wheel.

It is evident that when the pressure plate is moved toward the backing plate, it grippingly engages the friction disc and clamps the latter between the two plates to achieve the desired braking effects.

The present invention has in view as its foremost objective the provision of a brake of the character above indicated, which includes novel and improved means for actuating the pressure plate. More in detail, the invention has as an object the provision of an expansible diaphragm or Sylphon for actuating the pressure plate.

In carrying out these objectives in a practical embodiment, a bracket is mounted on the vehicle and presents a ring-like flange in spaced relation with respect to the pressure plate. A Sylphon in the form of a ring is interposed between this bracket and the pressure plate. This Sylphon is constructed so that when the pressure of the hydraulic medium therein is increased, it expands in an axial direction rather than radial.

Another object of the invention is the provision, in a brake of the character indicated, of pressure actuating means in the form of a bellows of ring shape that is expansible axially.

Various other more detailed objects and advantages of the invention such as arise in connection with carrying out the above noted idea in a practical embodiment, will in part become apparent and in part be hereinafter stated as the description of the invention proceeds.

The invention, therefore, comprises a disc brake including spaced backing and pressure plates, a friction disc interposed therebetween and drivably connected to a vehicle wheel, and an expansible diaphragm or bellows for actuating said pressure plate.

For a full and more complete understanding of the invention, reference may be had to the following description and accompanying drawings, wherein:

Figure 2 is a view taken normal to the showing of Figure 1, about on the plane represented by the line 2—2 of Figure 1; and Figure 3 is a detailed sectional view of a part of the brake operating mechanism.

Figure 1:
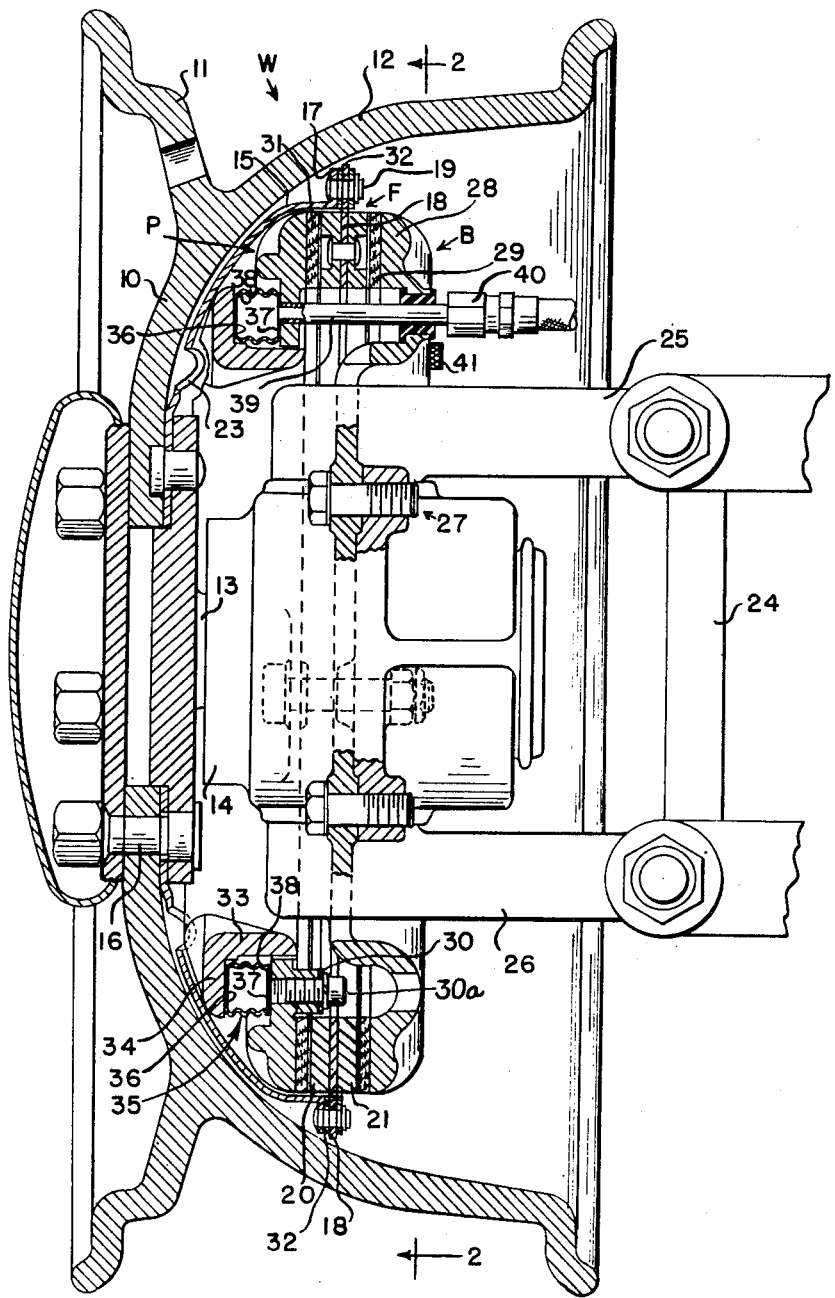
Figure 1 is a vertical section taken through a wheel and brake assembly, with the brake embodying the principles of this invention.

Referring now to the drawings wherein like reference characters denote corresponding parts, and first more particularly to Figure 1, a vehicle wheel is identified in its entirety by the reference character W. The wheel W may be of any desired type, although the invention takes as an illustrative embodiment, a structural arrangement in which the wheel W includes an inner shell 10 to which is integrally connected outer rim parts 11 and 12. It will be noted that the main rim part 12 blends in with the inner shell 10. The inner shell 10 is drivably mounted on a stub axle 13 which is journaled in a bearing block 14.

A disc shaped driving member 15 is anchored at its central portion to the shell 10 by the same bolts 16 which secure the wheel W to the axle 13. This member 15 is in driving relation with respect to the wheel W as it rotates therewith. The member 15 is formed with a radial flange 17, to which is anchored a friction disc element referred to in its entirety by the reference character F.

The friction disc F comprises a central plate of a ring-like formation designated 18 that is anchored to the flange 17 by the fastening pins shown at 19. The ring 18 carries on its opposite faces the rings 20 and 21 which, it is notable, are formed with slots 22 for cooling purposes. Adjacent to the flange 17 the member 15 may be formed with a plurality of openings 23 which function as an air circulating means when the wheel W rotates.

The chassis of the vehicle on which the wheel W is mounted has connected thereto a part of a parallelogram suspension shown at 24. Pivotally connected to the member 24 at the top is an upper member 25 that is anchored to the bearing block 14. Likewise, a lower member 26 is also anchored to the block. A backing plate referred to generally as B is secured to the block 14 by a bolt and flange construction shown at 27. The plate B includes an outer peripheral ring-like part 28 having a radial face that carries a friction lining 29.

A pressure plate P is mounted on and is spaced from the backing plate B by a plurality of leaf springs shown at 30 in Figure 2. Each of the springs 30 has one end anchored to a pin 30a on the backing plate B and the other end to a pin 30b on the plate P. The normal tendency of these springs is to maintain the plates in spaced relation, although this tendency may be overcome, as hereinafter explained, to urge the plates together.

The pressure plate P also has a radial face covered with a friction lining 31 that is disposed opposite to the friction disc F.

The periphery of the member 18 is formed with a series of spaced projections 32 as best seen in Figure 2 which are partially severed from the member 18 as shown at 32a to form tangentially extending spring fingers. These fingers are integrally attached at one end to the member 18 and have their free ends secured to the flange 17 by pins 19.

This mounting of the ring 18 permits a certain amount of lateral movement on the part of the friction disc F.

Also mounted on the bearing block on flanges 33' extending horizontally therefrom is a bracket 33 having a radial flange 34 which, together with the backing plate B, defines a channel-shaped recess that receives an expansible diaphragm or bellows 35. This bellows 35 includes an end ring 36 that engages the flange 34, and an oppositely disposed end ring 37 that engages the pressure plate P. These end rings 36 and 37 are joined by folds 38 which permit of relative expansion of the end members 36 and 37.

A tubular conduit 39 passes through aligned openings in the plates B and P within the friction disc F. This conduit is connected to the bellows 35. At its outer free end it carries a nipple 40 which extends to a hydraulic system which will supply a hydraulic to the bellows 35 under varying degrees of pressure as occasion demands.

A bleed plug is indicated at 41, and this plug is in conductive communication with the bellows 35 by the tubular conduit shown at 42 in Figure 3. This bleed plug permits the bleeding of air from the bellows 35.

Operation

While the operation of the above described brake is believed to be obvious, it is noted that when pressure on the hydraulic system is relieved, the springs 30 maintain the plates B and P in spaced relation, while the spring fingers 32 maintain the friction disc F in an intermedaite position in which the rings 20 and 21 are free of the friction linings 31 and 29. In this condition, the wheel W is free to rotate.

When the brakes are to be applied, the operator increases the pressure of the hydraulic medium in the system. This increased pressure causes the diaphragm or bellows 35 to expand. As this expansion is in an axial direction, the pressure plate P is pushed toward the backing plate B. As it moves it engages the friction disc F and clamps the latter between the backing and pressure plates B and P to achieve the desired braking effects.

While a preferred specific embodiment of the invention is hereinbefore set forth, it is to be clearly understood that the invention is not to be limited to the exact construction illustrated and described, because various modifications of these details may be provided in putting the invention into practice within the purview of the appended claims.

What is claimed is:

1. A disc brake comprising an annular backing plate having a flat annular braking surface at its periphery, means on the backing plate for fixedly mounting it adjacent a wheel, a flat annular flange spaced from the backing plate and of smaller diameter than said surface, means rigidly connecting the flange to the backing plate, an annular pressure plate movable toward and away from the backing plate and having a flat annular surface facing and spaced from the flange, an annular friction disc between the backing plate and the pressure plate, a dished supporting member extending over the flange and pressure plate and formed at its inner part for connection to a wheel, means connecting the outer edge of the supporting member to the friction disc, means to prevent relative rotation between the backing plate and the pressure plate, an annular expansible bellows lying between the flange and said surface on the pressure plate, and a fluid supply connection for the bellows extending through the backing plate and the pressure plate radially inward of the braking surface.

2. A disc brake comprising an annular backing plate, means on the backing plate for fixedly mounting it adjacent a wheel, a flat annular flange spaced from the backing plate, means rigidly connecting the flange to the backing plate, an annular pressure plate movable toward and away from the backing plate and having a flat annular surface facing and spaced from the flange, an annular friction disc between the backing plate and the pressure plate, a dished supporting member extending over the flange and pressure plate, tangentially extending spring strips connecting the friction disc and the outer edge of the supporting member, tangentially extending spring strips connecting the backing plate and the pressure plate, an annular expansible bellows lying between the flange and said surface on the pressure plate, and a supply conduit for the bellows extending through the backing plate and the pressure plate.

KENNETH E. LYMAN.

REFERENCES CITED

The following references are of record in the file of this patent:

UNITED STATES PATENTS

| Number | Name | Date |
|---|---|---|
| 1,679,495 | Rainsford | Aug. 7, 1928 |
| 1,804,185 | Skopik | May 5, 1931 |
| 2,094,065 | Frank | Sept. 28, 1937 |
| 2,303,041 | Glacy | Nov. 24, 1942 |

FOREIGN PATENTS

| Number | Country | Date |
|---|---|---|
| 374,169 | Great Britain | June 9, 1932 |
| 839,019 | France | Dec. 28, 1938 |